March 26, 1968     A. P. HORNE     3,374,672
FLOWMETER
Filed July 6, 1965
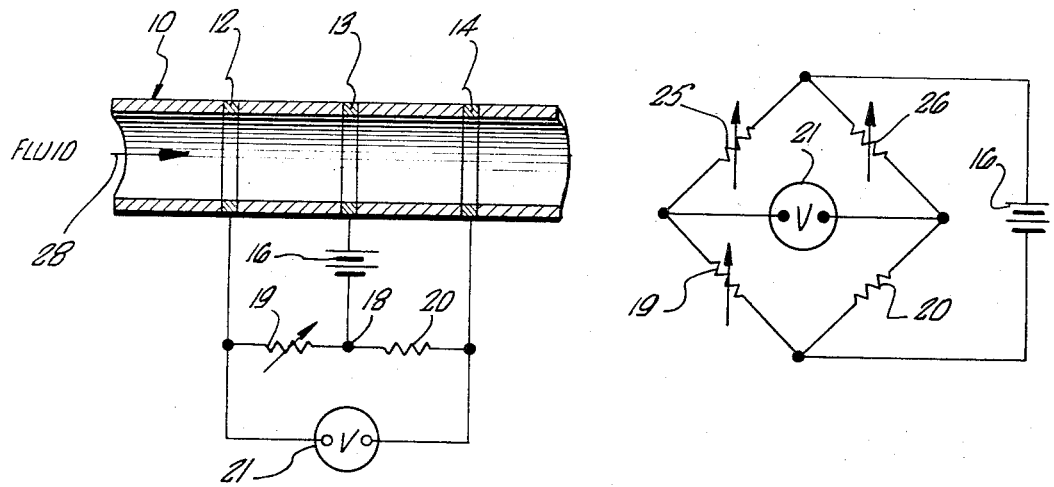
FIG_1_     FIG_2_
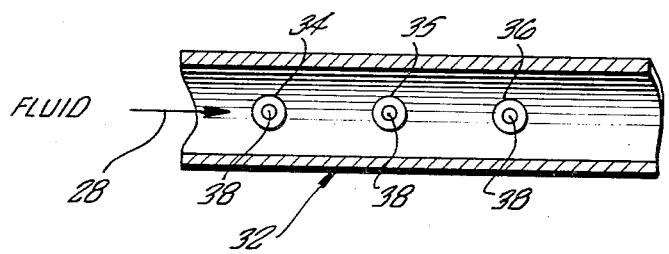
FIG_3_
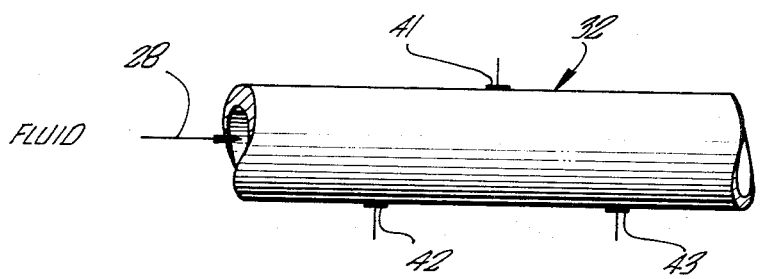
FIG_4_
INVENTOR.
ARTHUR P. HORNE
BY
Christie, Parker & Hale
ATTORNEYS.

United States Patent Office 3,374,672
Patented Mar. 26, 1968

3,374,672
FLOWMETER
Arthur P. Horne, Arcadia, Calif., assignor to California Institute Research Foundation, Pasadena, Calif., a corporation of California
Filed July 6, 1965, Ser. No. 469,647
3 Claims. (Cl. 73—194)

ABSTRACT OF THE DISCLOSURE

A flowmeter for measuring flow rate of a fluid in a conduit. Three electrodes are mounted in and insulated from the conduit, the electrodes being terminated flush with the inner surface of the conduit. The electrodes make electrical contact with the fluid, and are spaced apart to form an array of an upstream electrode, a central electrode, and a downstream electrode. Voltages are impressed across the electrodes to cause electrical currents to flow through the fluid, and differences in the currents are measured to determine fluid flow rate.

Background of the invention

Flow rate is a quantity of interest in many different types of devices, and a variety of flowmeters have been developed to measure this quantity. Some of these operate by measuring the speed of rotation of a rotor or turbine disposed in the flowing stream. Other types impress an externally generated magnetic field through a conductive fluid, flow rate being sensed by measuring the voltage generated by flow of the fluid. Another type operates by measuring the time required for a foreign material injected in the fluid to transverse a given length of a pipe or conduit in which the fluid flows.

There remains, however, a need for a simple, inexpensive flowmeter which presents little or no mechanical impedance to the flowing fluid, which does not require external magnets or injection of foreign materials, and which is easily compensated for changes in the characteristics of the fluid itself. The flowmeter of this invention meets this demand, and provides a transducer system suitable for a wide variety of applications and having mechanical and electrical simplicity. Turbulence-producing mechanical impedances in the fluid stream are minimized or completely eliminated, and the device is readily corrected for changes in composition and other characteristics of the flowing fluid.

Briefly stated, the flowmeter of this invention includes first, second and third electrodes disposed in a conduit containing the fluid whose flow rate is to be measured. The electrodes are in electrical contact with the fluid, and are serially disposed so the first electrode is upstream from the second electrode and the third electrode is downstream from the second electrode. Means are provided for impressing a voltage across the first and second electrodes, whereby a first current flows through the fluid between the electrodes. Means are provided for impressing a voltage across the second and third electrodes whereby a second current flows through the fluid between the electrodes. Means are provided for measuring the difference between the first and second currents, whereby a quantity analogous to flow rate is determined.

In a presently preferred form, the flowmeter comprises a Wheatstone bridge circuit in which two of the bridge arms are conductive paths through the fluid. Means are provided to impress a voltage across the bridge, and voltage-measuring means are provided to measure the unbalance voltage developed by the bridge.

The invention will be described in detail with reference to the attached drawings in which:

FIG. 1 is a combined electrical schematic and sectional elevation of the flowmeter;
FIG. 2 is an electrical schematic of an equivalent circuit of the flowmeter shown in FIG. 1;
FIG. 3 is a sectional elevation of a conduit showing another arrangement of electrodes suitable for use in the invention; and
FIG. 4 is a front elevation of a conduit, showing yet another arrangement of electrodes.

Referring to FIG. 1, a conduit 10 is part of a pipeline or channel containing a fluid, the flow rate of which is to be measured. The conduit is preferably formed of an insulating material such as plastic, ceramic or glass.

Three ring-shaped electrodes 12, 13 and 14 are embedded in the inner surface of the conduit. Preferably, the electrodes are positioned to be flush with the conduit surface. The electrodes are spaced apart whereby electrode 12 is located upstream from electrode 13 and electrode 14 is located downstream from electrode 13. Contact means, which may be a portion of each electrode, extend through the conduit whereby an external electrical connection can be made thereto.

One terminal of a voltage source 16 such as a battery, is connected to center electrode 13. A second terminal of voltage source 16 is connected to a series junction 18 of two series-connected resistors 19 and 20. Resistor 19 is preferably of the variable type. The series-connected resistors are connected between electrodes 12 and 14. A voltmeter 21, preferably of the high-impedance type, is connected across the two series-connected resistors.

An equivalent electrical circuit of the flowmeter is shown in FIG. 2, and will be recognized as the familiar four-arm Wheatstone bridge circuit. Resistors 19 and 20 form two arms of the bridge circuit. The other two arms of the circuit are represented by variable resistors 25 and 26, these resistors being analogous to the current-flow paths through the fluid flowing past the electrodes. That is, variable resistor 25 represents the conduction path between electrodes 12 and 13, and variable resistor 26 represents the conduction path between electrodes 13 and 14.

Voltage source 16 is connected across two opposite terminals of the bridge. Voltmeter 21 is connected across the remaining two opposite terminals of the bridge to measure the degree of bridge unbalance. The theory of a Wheatstone bridge is familiar to those skilled in the art, and, for brevity, will not be described in detail.

In operation of the flowmeter, a fluid which is at least slightly electrically conductive is admitted to the conduit as indicated by an arrow 28 in FIG. 1. An electrical potential is impressed between center electrode 13 and each of the outer electrodes 12 and 14 by voltage source 16. As a result of this electrical potential or voltage, two separate currents flow through the conductive fluid. The first current flows between electrodes 12 and 13, through the closed loop which includes voltage source 16 and resistor 19. The second current flows between electrodes 13 and 14 through the closed loop which includes voltage source 16 and resistor 20.

With the fluid standing stationary in the conduit and in contact with the electrodes, variable resistor 19 is adjusted until zero potential difference is indicated by voltmeter 21. This is the equivalent of balancing the bridge circuit shown in FIG. 2. The fluid is then allowed to flow through the conduit, and the bulk motion of the ions carrying the electrical current acts to reduce the current flow between electrodes 12 and 13, and to increase the current flow between electrodes 13 and 14. In terms of the equivalent bridge circuit shown in FIG. 2, this action is analogous to increasing the resistance of resistor 25 and decreasing the resistance of resistor 26. The bridge circuit is thereby unbalanced, and voltmeter 21 measures the resulting potential difference across the bridge.

The flowmeter can be calibrated on conventional flow-calibration apparatus. The flowmeter is relatively unaffected by changes in conductivity of the flowing fluid, as both of the two currents flowing through the fluid are equally affected by any such change. The bridge circuit is therefore especially advantageous as it tends to cancel the effects of changes in fluid conductivity.

The invention is not restricted to the specific electrode configuration suggested in FIG. 1. For example, FIG. 3 illustrates a method for mounting electrodes in an electrically conductive conduit 32. Three plugs 34, 35 and 36 are disposed through and secured to the wall of the conduit. The plugs are formed from an insulating material such as plastic, ceramic or glass. A conductive electrode 38 is disposed through the center of each of the insulating plugs whereby the three electrodes are insulated from the conduit and from each other. As discussed above, the electrodes are disposed so a center electrode is located intermediate between an upstream electrode and a downstream electrode.

The electrodes need not be directly in line, and an alternative arrangement having out-of-line electrodes is shown in FIG. 4. One electrode 41 is disposed on one side of the conduit and extends through the conduit to contact a fluid flowing therein. A second electrode 42 is disposed through the conduit opposite and upstream from electrode 41. A third electrode 43 is disposed through the conduit opposite and downstream from electrode 41. Electrodes 41, 42 and 43 may be disposed through insulating plugs in the same manner as shown in FIG. 3.

The flowmeter of this invention is especially advantageous as the electrodes may be made flush with the inner surface of the conduit. No mechanical impedance is therefore presented to the flowing stream, eliminating induced turbulence and reduction of flow efficiency.

The invention is not confined to the specific bridge circuit described, and it is to be understood that various other circuits can be employed for measuring the ratio or difference of the two currents through the fluid without departing from the spirit of the invention.

What is claimed is:

1. A flowmeter for measuring flow rate of a fluid, comprising a conduit adapted to receive the flowing fluid; first, second and third electrodes embedded in the conduit in contact with the fluid, the electrodes being flush with the interior of the conduit whereby the electrodes present substantially no mechanical impedance to the flowing fluid, the first electrode being disposed upstream from the second electrode, and the third electrode being disposed downstream from the second electrode; means for electrically insulating each electrode from the conduit; means for impressing a voltage across the first and second electrodes whereby a first current flows through the fluid between the electrodes; means for impressing a voltage across the second and third electrodes whereby a second current flows through the fluid between the electrodes; and means for measuring the difference between the first and second currents.

2. A flowmeter for measuring flow rate of a fluid, comprising a conduit formed of an electrical insulating material and adapted to receive the flowing fluid; first, second and third electrodes embedded in the conduit in contact with the fluid, the electrodes being flush mounted in the interior surface of the conduit whereby the electrodes present substantially no mechanical impedance to the flowing fluid, the first electrode being disposed upstream from the second electrode, and the third electrode being disposed downstream from the second electrode; means for impressing a voltage across the first and second electrodes whereby a first current flows through the fluid between the electrodes; means for impressing a voltage across the second and third electrodes whereby a second current flows through the fluid between the electrodes; and means for measuring the difference between the first and second currents.

3. A flowmeter for measuring flow rate of a fluid, comprising a conduit adapted to receive the flowing fluid; first, second and third electrodes embedded in the conduit in contact with the fluid, the electrodes being flush with the interior of the conduit whereby the electrodes present substantially no mechanical impedance to the flowing fluid, the first electrode being disposed upstream from the second electrode, and the third electrode being disposed downstream from the second electrode; means for electrically insulating each electrode from the conduit; a voltmeter connected between the first and third electrodes; two series-connected resistors connected across the voltmeter; and a voltage source connected between the second electrode and the series connection of the two resistors.

References Cited

UNITED STATES PATENTS

| | | | |
|---|---|---|---|
| 1,411,796 | 4/1922 | Meyer | 73—194 |
| 2,611,268 | 9/1952 | Mellen | 73—194 |
| 3,028,546 | 4/1962 | Sproule | 324—30 XR |
| 3,148,541 | 9/1964 | Higgins | 73—204 |
| 3,242,729 | 3/1966 | Keller | 73—194 |

FOREIGN PATENTS

| | | |
|---|---|---|
| 1,078,592 | 5/1954 | France. |

RICHARD C. QUEISSER, *Primary Examiner.*

C. A. RUEHL, *Assistant Examiner.*